United States Patent [19]

Zaromb

[11] 4,150,197
[45] Apr. 17, 1979

[54] METHODS FOR GENERATING HEAT AND ELECTRICAL ENERGY FROM ALUMINUM WASTE AND OTHER INEXPENSIVE ALUMINUM PRODUCTS

[76] Inventor: Solomon Zaromb, 171 Clifton Ave., Newark, N.J. 07104

[21] Appl. No.: 843,155

[22] Filed: Oct. 17, 1977

[51] Int. Cl.² .............................................. H01M 8/06
[52] U.S. Cl. ........................................ 429/15; 429/17; 429/19; 429/26
[58] Field of Search ....................... 429/13, 14, 15, 17, 429/19, 26, 12

[56] References Cited
U.S. PATENT DOCUMENTS

| 3,172,784 | 3/1965 | Blackmer | 429/13 |
| 3,391,027 | 7/1968 | Porter | 429/13 |
| 3,788,899 | 1/1974 | Zaromb | 429/26 |
| 3,981,747 | 9/1976 | Doniat | 429/15 |

Primary Examiner—Anthony Skapars

[57] ABSTRACT

Aluminum pieces of various shapes and sizes, up to a certain maximum predetermined size, are introduced upon demand into a reaction chamber wherein they react with an aqueous electrolyte solution to generate heat, electricity, and an aluminum hydroxide reaction product. The aqueous electrolyte solution is usually strongly acidic or strongly alkaline, but the latter is preferred. The electricity may be generated either directly, with said reaction chamber comprising a packed-bed anode forming part of an electrochemical cell, or indirectly, by first generating hydrogen in said chamber, and thereafter consuming the hydrogen in a fuel cell. The heat generated in said chamber is carried away by a circulating fluid and used for space-heating and other applications. The aluminum hydroxide reaction product is removed from the system and recycled in the production of fresh aluminum.

15 Claims, 4 Drawing Figures

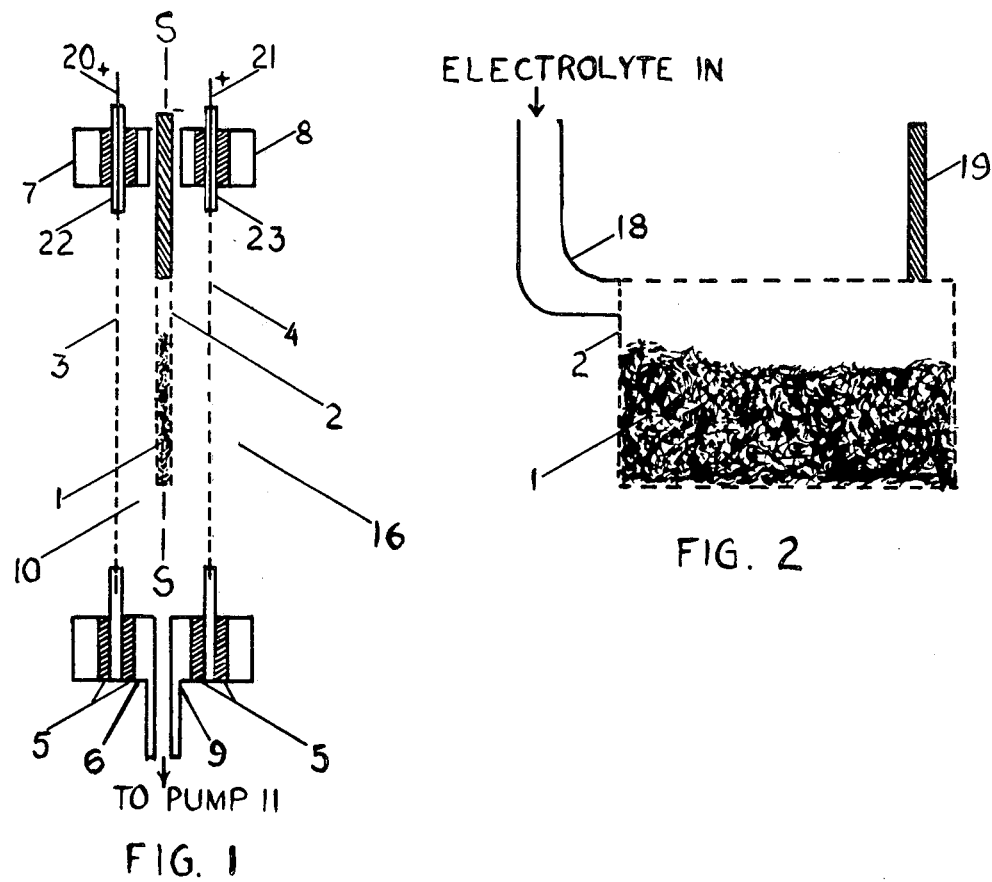
FIG. 1
FIG. 2
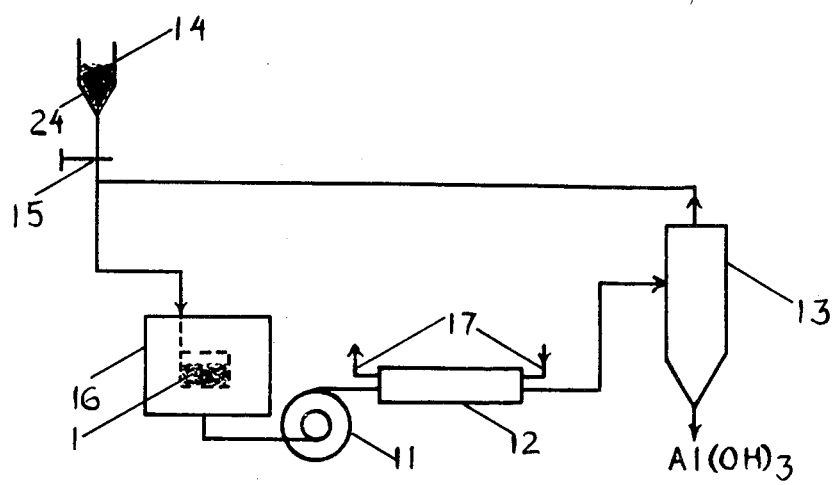
FIG. 3

4,150,197

METHODS FOR GENERATING HEAT AND ELECTRICAL ENERGY FROM ALUMINUM WASTE AND OTHER INEXPENSIVE ALUMINUM PRODUCTS

This is a continuation-in-part of my application Ser. No. 704,452, filed July 12, 1976, now abandoned.

BACKGROUND OF THE INVENTION

This invention relates to methods and apparatus for generating heat and electrical energy from aluminum waste and other inexpensive aluminum products.

Approximately two megatons of aluminum is recently being lost in refuse annually within the United States. In spite of intensified efforts by major aluminum producers to recycle aluminum cans and other aluminum waste, the aluminum collected in the recycling drive has thus far totalled only about 0.1 megaton per year, i.e., only about 5% of the total aluminum lost. The rather low density of aluminum collection centers (only about 2,000 throughout the United States) appears to be the main reason for the very limited success of the recycling drive. Yet a much higher density of such collection centers is precluded by the cost of operating them and by the diminishing return per center with an increasing number of such centers.

It is an object of my invention to increase the collection and utilization of aluminum waste by providing a significant fraction of the population with an attractive use for various aluminum products.

The use of aluminum as anode material in batteries, especially aluminum-air batteries, has been taught in several of my publications and patents. However, these batteries utilize aluminum plates or sheets whose dimensions are prescribed by the particular battery design. It would be difficult to adapt the various forms of aluminum waste to the types of aluminum batteries disclosed in prior art.

In my copending application Ser. No. 813,483, filed July 7, 1977, I have disclosed the use of slurry-type aluminum anodes in conjunction with fluidized-bed air cathodes. Such slurry-type anodes should be capable of utilizing aluminum waste products after the latter had been cut up or otherwise comminuted into fine particles or chips suitable for being carried by an electrolyte into properly designed anode compartments. The particles of such a slurry-type anode represent one common form to which the various types of aluminum waste may be reduced in order to be suitable for electrochemical consumption yielding heat and electricity.

It is thus another object of my invention to provide the means whereby the various forms of aluminum waste reduced to a suitable size can be consumed electrochemically so as to yield heat and electrical energy.

The use of slurry-type anodes, as taught in my aforecited copending application Ser. No. 813,483, may be associated with corrosion of the aluminum particles suspended in the slurry. This corrosion may be minimized by introducing corrosion-inhibiting additives into the electrolyte in which these particles are suspended.

However, it is yet another object of my invention to provide a more efficient and otherwise more practical means of generating electricity for such applications as electric vehicle propulsion, utilizing aluminum waste and other inexpensive aluminum products as an electrochemical fuel.

The aluminum-air batteries disclosed thus far necessitate frequent replacement of spent aluminum by fresh aluminum anodes, and, associated therewith, considerable work to ensure proper electrical connection of the fresh anodes to the negative battery terminals. The slurry-type anodes disclosed in my aforecited copending application, the electrical connections between the suspended particles are inferior to those in packed-bed anodes.

It is therefore still another object of my invention to provide a convenient means of feeding aluminum fuel to an aluminum-air cell upon demand, and to provide improved electrical connections between said fuel and the negative cell terminal.

It is still another object of my invention to recover the aluminum hydroxide product generated in the electrochemical consumption of aluminum and thereby effect substantial savings in the energy and mineral resource content of the aluminum products presently lost in refuse.

SUMMARY OF THE INVENTION

Briefly, my invention consists of providing a reaction chamber wherein aluminum pieces of various shapes and sizes, up to a certain maximum predetermined size, may be introduced upon demand and reacted with an aqueous electrolyte solution to generate heat, electricity, and aluminum hydroxide. The aqueous solution is usually strongly acidic of strongly alkaline, but alkaline electrolytes are usually preferable. The electricity may be generated either directly, by having said reaction chamber forming part of an electrochemical cell, or indirectly, by first generating hydrogen in said reaction chamber, and thereafter consuming the hydrogen in a fuel cell. The heat generated in said chamber is carried away by a circulating fluid and used for space heating and other applications. The aluminum hydroxide reaction product is removed from the system and recycled in the production of fresh aluminum.

BRIEF DESCRIPTION OF THE DRAWINGS

My invention may best be understood with reference to the drawings, in which:

FIG. 1 is a schematic cross-sectional diagram of one preferred embodiment of my invention;

FIG. 2 is a schematic view of section S—S of FIG. 1, perpendicular thereto;

FIG. 3 is a block diagram of a system incorporating the embodiment of FIG. 1.

DESCRIPTION OF THE PREFERRED EMBODIMENTS

Figure 4:
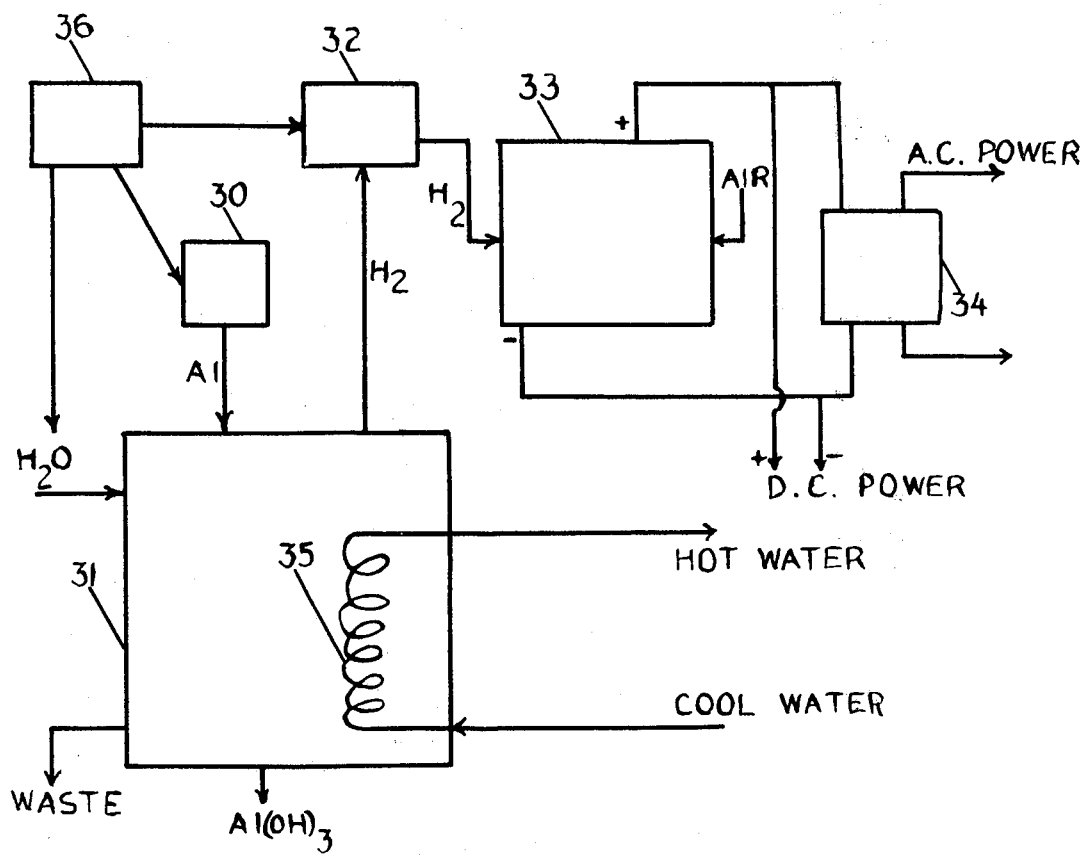
FIG. 4 is a block diagram of a system constituting an alternative embodiment of my invention.

In the embodiment of FIGS. 1-3, the aluminum waste products are first ground down or cut up by a suitable cutting, grinding or other comminuting device (not shown) into particles sufficiently small to be capable of being carried by an aqueous alkaline electrolyte into a narrow packed-bed anode compartment of an electrochemical cell. Apparatus for grinding or cutting up aluminium objects may include a lathe, milling machine, grinder, and/or a guillotine-type device, or a suitable combination of the operating principles of one or more such devices, all of which are well known to persons skilled in the machanical arts. Alternatively, some of the newest processes for producing inexpensive aluminum may be adapted to yield aluminum in form of small particles.

In FIG. 1 is shown a symmetrical electrochemical cell 16 comprising a central packed-bed anode 1 within a current-collecting grid 2 between two oxygen- or air-depolarized cathodes 3 and 4. The latter are provided with positive cell terminals 20, 21, and bordered by cathode frames 22, 23, which are clamped between rubber gaskets 5 and an electrically insulating plastic spacer 6 by outer frames 7 and 8, so as to form an electrolyte chamber 10. A nipple 9 at the lower edge of plastic spacer 6 connects electrolyte chamber 10 to pump 11 and hence to the rest of the circulation system shown in the block diagram of FIG. 3. The latter includes a heat-exchanger 12 for removing the heat generated in cell 16, a cyclone separator 13 for removing aluminum hydroxide from the electrolyte, and a supply hopper 14 controlled by valve 15 for supplying aluminum particles to anode 1 of cell 16. A circulating fluid 17, usually water, removes the heat from exchanger 12.

The view through the central section S—S of FIG. 1 perpendicular to the drawing is shown in FIG. 2. The electrolyte returning from cyclone separator 13 is fed back into the upper portion of current-collecting grid 2 containing the packed-bed anode 1. Some of the aluminum chips 24 in supply hopper 14 of FIG. 3 are allowed by control valve 15 to drop into the circulating electrolyte, and are carried by said electrolyte via inlet tube 18 into the current-collecting grid 2, which is in form of a rectangular box made of wire mesh or extended metal screen (which may be of nickel or any other metal substantially inert to the electrolyte under the selected operating conditions). The mesh of grid 2 is fine enough to retain the aluminum particles while permitting free flow of the electrolyte. The latter flow is directed downward towards outlet nipple 9 of cell 16. This downward flow of the electrolyte together with the force of gravity combine to keep the aluminum particles packed against the lower portion of grid 2. A metallic tab 19 attached to grid 2 provides the negative terminal of cell 16.

The electrolyte circulating through cell 16 and through the rest of the flow system of FIG. 3 is an aqueous alkaline solution comprising between 2 and 10 moles per liter of sodium or potassium hydroxide, preferably 10–30% by weight of potassium hydroxide, and such corrosion-inhibiting additives as sodium or potassium stannate, sodium or potassium gallate, indic hydroxide, thallous hydroxide, and/or mercuric oxide. The latter causes surface amalgamation of the aluminum particles which in turn improves the electrical contacts between adjacent particles in packed-bed anode 1 and also between the particles and grid 2.

Other ways of ensuring good electrical contacts between the particles of anode 1 is to have the particles preferably in elongated form, e.g., needle-shaped or in form of flat elongated chips or flattened elongated pellets. The surfaces of these particles must, of course, be free of insulating materials. If the particles are obtained from aluminum cans, the latter must first be stripped of any coatings or lacquers baked thereon. The stripping may be effected either chemically by immersion in sulfuric acid for 30 to 60 seconds or in methylethyl ketone for longer periods of time or else mechanically by sanding, sandblasting or the like. Furthermore, to remove any oil or grease introduced in the cutting or grinding operation, the aluminum particles should be degreased in trichloroethylene or an equivalent solvent, etched for about 10 seconds in a hot concentrated (approximately 10 molar) NaOH or KOH solution, and rinsed with water before being introduced into supply hopper 14. These stripping, etching and rinsing operations may be performed with conventional apparatus (not shown).

Once the aluminum particles have been surface-amalgamated through exposure to a mercuric oxide-containing electrolyte solution, the protective oxide film on their surface is partly destroyed, and they become subject to oxidation upon exposure to air. Therefore, the aluminum should be introduced into the electrolyte only sparingly upon demand. Any aluminum left within anode 1 upon cessation of demand for electrical power should be fully used up to charge an auxiliary secondary battery or to provide other useful energy. Alternatively, any residual aluminum in anode 1 may be protected on shut-down both from corrosion by the aqueous electrolyte and from air-oxidation by displacing the electrolyte with a non-reactive fluid, such as diethyl carbitol.

In order to minimize the amount of aluminum remaining in cell 16 upon cessation of demand for power, the consumption time of the aluminum particles should be preferably brief. This will occur if the particles are thin, preferably not more than about 0.1 millimeter thick, and are consumed from both sides at a fairly high current density, preferably higher than 0.1 ampere/$cm^2$. At such current densities, any corrosion of the aluminum particles will also be reduced. Furthermore, to prevent corrosion arising from thermal runaway, the electrolyte in cell 16 must circulate at a sufficient rate and it must be cooled sufficiently in heat exchanger 12 to remove the heat generated in cell 16 and to maintain the temperature within cell 16 below a predetermined value, preferably below 60° C.

The rates of circulation of the electrolyte and of the cooling liquid 17 can be readily controlled by temperature sensors (not shown). Similarly, the polarization of the aluminum particles through current drain can be automatically maintained within a satisfactory range by a voltage-sensing circuit (not shown) designed to actuate supply valve 15 when the output voltage of cell 16 falls below a predetermined range or to connect cell 16 to charge a secondary battery when said output voltage exceeds said predetermined range. Depending on the operating temperature and on the characteristics of the air cathodes 3 and 4, this output voltage should usually be in the range of $1.4 \pm 0.3$ volt in well-designed cells.

Although air-depolarized cathodes are preferred for most applications, other types of cathodes, e.g., those depolarized by hydrogen peroxide or by an oxidizing halogen compound, may also be suitable for special purposes, e.g., for submarines.

The afore-disclosed embodiment represents a type of fuel cell wherein the fuel consists of aluminum particles supplied to the cell upon demand. These particles may derive from a variety of aluminum waste or other inexpensive aluminum products. However, in order to be easily carried by the electrolyte into packed-bed anode 1, these particles should not be larger than about 0.1 mm $\times$ 0.4 mm $\times$ 2 mm.

On the other hand, in a second embodiment of my invention, the maximum size of the aluminum pieces which may be introduced as fuel may be quite large, so that many waste products may be used with little or no modification. However, whereas the fuel cell of FIGS. 1–3 is most suitable for providing portable energy in highly compact form for such applications as electric vehicle propulsion, this second embodiment appears to be more appropriate for stationary applications, e.g., to provide heat and electricity to various types of buildings.

As indicated in FIG. 4, aluminum waste is fed piecemeal from supply hopper 30, preferably in small quantities, into an aluminum-water reactor 31 comprising preferably a strongly acidic or strongly basic aqueous electrolyte. The former may consist of hydrochloric, nitric or sulfuric acid. However, in most cases, an alkaline electrolyte containing 3 to 10 moles/liter of NaOH of KOH may be preferable. In any of these electrolytes, the aluminum reacts with water to yield hydrogen, aluminum hydroxide, and heat:

$$Al + 3H_2O \rightarrow Al(OH)_3 + 1.5H_2 + 99.3 \text{ kilocalories/mole} \qquad (1).$$

The hydrogen, in turn, may be either burned in air according to the reaction $$H_2 + 0.5O_2 \rightarrow H_2O + 68.3 \text{ kilocalories/mole} \qquad (2)$$

or it may be fed into a fuel cell 33, where the same overall reaction (2) may yield in practice between 30 and 40 kilocalories per mole of hydrogen in form of electrical energy. The result of reactions (1) and (2) is $$Al + 1.5H_2O + 0.75\ O_2 \rightarrow Al(OH)_3 + 202 \text{ kilocalories/mole} \qquad (3).$$

We thus have the options of:

(a) converting all of the available energy into heat and obtaining therefrom 202 kilocalories/gram-mole of aluminum; or (b) feeding the hydrogen from reaction (1) into fuel cell 33 and thereby deriving about 50 kilocalories of electrical energy and 150 kilocalories of heat per 27 grams of aluminum. In terms of more popular units, the options are between deriving 13,500 BTU in form of heat only or about 1 kilowatt-hour of electrical energy plus 10,000 BTU of heat per pound of aluminum waste. The latter option represents a recovery of about 40% of the energy of producing aluminum from its ore when the energy required to obtain of the aluminum hydroxide reaction product is included in the calculation.

If the hydrogen evolved in reaction (1) is to be converted into electricity, then a metal hydride storage container 32 may be provided to store the hydrogen safely before its being fed to fuel cell 33. Moreover, since most of the present electrical appliances are designed for alternating current, a D.C.-to-A.C. converter 34 may be required.

If the heat generated in reaction (1) or (3) be utilized for space conditioning, then a liquid-to-liquid heat exchanger 35 must be incorporated in reactor 31. The hot water from the reactor may then be piped into a building's hot water system.

Whereas in the embodiment of FIGS. 1-3 the electrolyte temperature is preferably maintained below 60° C., the temperature in reactor 31 may be allowed to reach 100° C. or more, up to slightly below the boiling point of the electrolyte solution. To prevent corrosion of reactor 31 and of exchanger 35, the surfaces exposed to the electrolyte may be lined with or made of an inert plastic such as polytetrafluoroethylene.

The Al(OH)$_3$ product of reaction (1) or (3) may be allowed to settle near the bottom of reactor 31, and may be written therefrom at appropriate intervals and returned to aluminum manufacturers for credit. Impurities in the aluminum waste, such as paper, lacquers, etc., may be skimmed off and discarded as useless waste.

Finally, as indicated in FIG. 4, a control unit 36 is required to feed the water and aluminum into reactor 31, or hydrogen into fuel cell 33, according to demand, to maintain the proper temperature within reactor 31, and to otherwise ensure proper functioning of the entire system. For instance, when the temperature in reactor 31 exceeds a maximum predetermined value, any feeding from hopper 30 is interrupted, and the liquids on both sides of heat exchanger 35 are caused to circulate at a maximum rate.

Depending on the size of building to be heated and the building's minimum heating requirements at any given time, the amount of aluminum to be introduced at one time into reactor 31 may range from about 100 grams to well over a kilogram. The maximum weight of the aluminum waste products which may be efficiently introduced at one scoop into reactor 31 should therefore usually be about 100 grams. Hence aluminum objects weighing less than 100 grams may usually be introduced into reactor 31 without any modification other than a possible surface treatment of objects covered by an acid- or alkali-resistant coating which might interfere with reaction (1).

There will now be obvious to those skilled in the art many modifications and variations of the above-disclosed embodiments, which, however, shall fall within the scope of my invention if defined by the following claims.

I claim:

1. A method of generating heat and electricity from the consumption of a variety of aluminum products which comprises:

(a) introducing an aqueous electrolyte solution into a reaction chamber adapted for introduction therein of aluminum pieces of various shapes and sizes up to a certain maximum predetermined size and for effecting therein a chemical reaction between said aqueous electrolyte and said aluminum pieces yielding an aluminum hydroxide reaction product;

(b) feeding said aluminum pieces into said reaction chamber in small quantities upon demand;

(c) removing the heat generated in said reaction chamber as a result of said reaction;

(d) removing said aluminum hydroxide reaction product at suitable intervals; and (e) generating electrical energy as a by-product of said reaction.

2. A method as claimed in claim 1, wherein said electrolyte comprises between 2 and 10 moles/liter of potassium or sodium hydroxide.

3. A method as claimed in claim 1, wherein said aluminum pieces are fed to and retained within a current-collecting grid of a packed-bed anode forming part of an electrochemical cell, thereby generating said electricity.

4. A method as claimed in claim 3, which comprises circulating said electrolyte through said current-collecting grid and feeding said aluminum pieces from a supply hopper through a control valve into said electrolyte, thereby causing said aluminum pieces to be carried by said electrolyte into said packed-bed anode.

5. A method as claimed in claim 4, wherein the flow of said electrolyte through said packed-bed anode in substantially downward.

6. A method as claimed in claim 3 wherein said aluminum pieces are thin and elongated.

7. A method as claimed in claim 4 which comprises actuating said control valve by a voltage-sensing circuit so as to cause said aluminum pieces to be fed to said anode when the voltage of said cell falls below a predetermined valve.

8. A method as claimed in claim 3, wherein said electrochemical cell also comprises an oxygen-or air-depolarized cathode.

9. A method as claimed in claim 3, wherein said electrolyte solution also contains an additive of the group comprising stannate ions, gallate ions, indic hydroxide, thallous hydroxide, and mercuric oxide.

10. A method as claimed in claim 1, comprising the preliminary steps of removing lacquers and other insulating materials from the surfaces of various aluminum objects and reducing said aluminum objects to said maximum predetermined size.

11. A method as claimed in claim 1, which also comprises maintaining the temperature of said electrolyte below a maximum predetermined value.

12. A method as claimed in claim 1 which comprises generating hydrogen by said chemical reaction, and feeding said hydrogen to a fuel cell so as to generate electricity thereby.

13. A method as claimed in claim 12, which comprises storing said hydrogen as a metal hydride and feeding it to said fuel cell upon demand.

14. A method as claimed in claim 3, whrein said electrochemical cell also comprises a cathode which is depolarized by hydrogen peroxide.

15. A method as claimed in claim 3, wherein said electrochemical cell also comprises a cathode which is depolarized by a halogen compound.

* * * * *